US012676637B2

(12) United States Patent
Henzler et al.

(10) Patent No.: US 12,676,637 B2
(45) Date of Patent: Jul. 7, 2026

(54) LOAD MODULATED RADIO-FREQUENCY AMPLIFIER WITH EXTENDED TUNING RANGE

(71) Applicant: Apple Inc., Cupertino, CA (US)

(72) Inventors: Stephan Henzler, Munich (DE); Andreas Langer, Munich (DE)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 18/296,295

(22) Filed: Apr. 5, 2023

(65) Prior Publication Data

US 2024/0146338 A1 May 2, 2024

Related U.S. Application Data

(60) Provisional application No. 63/421,075, filed on Oct. 31, 2022.

(51) Int. Cl.
H04B 1/00 (2006.01)
H04B 1/14 (2006.01)

(52) U.S. Cl.
CPC ............. H04B 1/0028 (2013.01); H04B 1/14 (2013.01)

(58) Field of Classification Search
CPC ...... H04B 1/0028; H04B 1/14; H04B 1/0458; H03F 2200/102; H03F 2200/231; H03F 2200/387; H03F 2200/451; H03F 3/19; H03F 2200/541; H03F 1/565; H03F 3/245
See application file for complete search history.

(56) References Cited

U.S. PATENT DOCUMENTS

| | | | |
|---|---|---|---|
| 6,349,216 B1 | 2/2002 | Alberth, Jr. et al. | |
| 6,438,360 B1* | 8/2002 | Alberth, Jr. ........... | H03F 1/0222 |
| | | | 455/110 |
| 8,868,011 B2 | 10/2014 | Wright | |
| 9,432,060 B2 | 8/2016 | Hellberg | |
| 9,887,671 B2 | 2/2018 | Kobayashi et al. | |
| 10,122,326 B2 | 11/2018 | Cabanillas | |
| 10,644,592 B2 | 5/2020 | Ongaro et al. | |
| 11,218,121 B2 | 1/2022 | Anger et al. | |
| 2007/0132509 A1* | 6/2007 | Mochizuki ................ | H03F 1/26 |

(Continued)

FOREIGN PATENT DOCUMENTS

CN 111193480 A 5/2020

*Primary Examiner* — Lana N Le
(74) *Attorney, Agent, or Firm* — Treyz Law Group; Jason Tsai

(57) ABSTRACT

An electronic device may include wireless circuitry having an amplifier configured to receive a radio-frequency signal generated from a baseband signal, a first adjustable load component coupled to an output of the amplifier, a second adjustable load component coupled to the output of the amplifier, and a control signal generator configured to output one or more control signals for tuning the first and second adjustable load components based on an envelope of the baseband signal or the radio-frequency signal. The first adjustable load component can provide a first tuning range covering a first subrange of an instantaneous signal envelope of the baseband signal or the radio-frequency signal, whereas the second adjustable load can provide a second tuning range covering a second subrange of the instantaneous signal envelope of the baseband signal or the radio-frequency signal. The first and second tuning ranges are combined to provide an extended tuning range.

14 Claims, 8 Drawing Sheets

(56)                    References Cited

U.S. PATENT DOCUMENTS

2009/0325521 A1*  12/2009  Dubash .................... H04B 1/28
                                            455/150.1
2011/0043282 A1    2/2011  Drogi et al.
2014/0248844 A1*   9/2014  Langer ..................... H03F 3/19
                                            455/127.2
2015/0155838 A1*   6/2015  Embar ..................... H03F 1/56
2017/0040948 A1    2/2017  Levesque
2018/0131333 A1    5/2018  Cabanillas
2020/0067540 A1*   2/2020  Xu .......................... H04B 1/04
2020/0119440 A1*   4/2020  Paulsen ............... H04B 1/0458
2023/0020495 A1*   1/2023  Lehtola .................. H03F 3/245
2023/0370027 A1*   11/2023  Tuffy ..................... H03F 1/565
2023/0412130 A1*   12/2023  Cassia ................. H04B 1/0458
2025/0150045 A1*   5/2025  Hwang ................... H04B 1/04

* cited by examiner

LOAD MODULATED RADIO-FREQUENCY AMPLIFIER WITH EXTENDED TUNING RANGE

This application claims the benefit of U.S. Provisional Patent Application No. 63/421,075, filed Oct. 31, 2022, which is hereby incorporated by reference herein in its entirety.

FIELD

This disclosure relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna can be fed through one or more power amplifiers, which are configured to amplify low power analog signals to higher power signals more suitable for transmission through the air over long distances. It can be challenging to design a satisfactory power amplifier for an electronic device.

SUMMARY

An electronic device may include wireless communications circuitry. The wireless communications circuitry may include one or more processors or signal processing blocks for generating baseband signals, a transceiver for receiving the digital signals and for generating corresponding radio-frequency signals, and one or more radio-frequency power amplifiers configured to amplify the radio-frequency signals for transmission by one or more antennas in the electronic device. At least one of the radio-frequency power amplifiers can be implemented as a load-line modulated radio-frequency amplifier circuit. The load-line modulated radio-frequency amplifier circuit can include an amplifier core coupled to one or more adjustable load impedances.

As aspect of the disclosure provides wireless circuitry that includes a radio-frequency amplifier configured to receive a radio-frequency signal generated from a baseband signal, a first adjustable load component coupled to an output of the radio-frequency amplifier, a second adjustable load component coupled to the output of the radio-frequency amplifier, and a control signal generator configured to output one or more control signals for tuning the first and second adjustable load components based on an envelope of the baseband signal or the radio-frequency signal. The first adjustable load component can be configured to provide a first impedance tuning range for a first subrange of the envelope, whereas the second adjustable load component can be configured to provide a second impedance tuning range for a second subrange of the envelope. The first and second adjustable load components can be coupled to the output of the radio-frequency amplifier via first and second coupling circuits, respectively, or via a joint coupling circuit.

An aspect of the disclosure provides a method of operating wireless circuitry that includes receiving at an amplifier a radio-frequency signal that is generated based on a baseband signal, tuning a first adjustable load component at an output of the amplifier using a first load tuning control signal that is derived from an envelope of the baseband signal or the radio-frequency signal, and tuning a second adjustable load component at the output of the amplifier using a second load tuning control signal that is derived from the envelope of the baseband signal or the radio-frequency signal. The first adjustable load component can be used to provide a first impedance tuning range for a first subrange of the envelope, whereas the second adjustable load component can be used to provide a second impedance tuning range, different than the first impedance tuning range, for a second subrange of the envelope. A control signal generator can be used to generate a control signal based on the envelope of the baseband signal or the radio-frequency signal. A first conversion circuit can be used to output the first load tuning control signal based on a first range of the control signal, and a second conversion circuit can be used to output the second load tuning control signal based on a second range of the control signal. The second control signal can be shifted from the first control signal by a fixed or adjustable offset.

An aspect of the disclosure provides an electronic device that includes one or more processors configured to generate a baseband signal, an upconverter configured to convert the baseband signal into a radio-frequency signal, and a load-line modulated amplifier circuit configured to amplify the radio-frequency signal. The load-line modulated amplifier circuit can include an amplifier configured to receive the radio-frequency signal, a first adjustable load component coupled to an output of the amplifier and configured to provide a first tuning range covering a first subrange of an instantaneous signal envelope of the baseband signal or the radio-frequency signal, and a second adjustable load component coupled to the output of the amplifier and configured to provide a second tuning range covering a second subrange of the instantaneous signal envelope of the baseband signal or the radio-frequency signal. The first and second tuning ranges are combined to provide an extended tuning range for the load-line modulated amplifier circuit.

DETAILED DESCRIPTION

Figure 1:
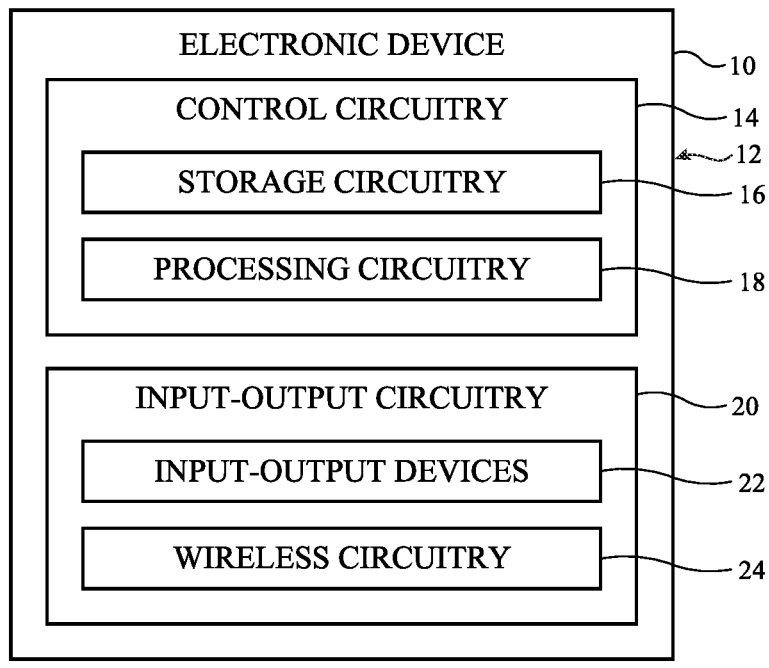
FIG. 1 is a diagram of an illustrative electronic device having wireless circuitry in accordance with some embodiments.

An electronic device such as device 10 of FIG. 1 may be provided with wireless circuitry. The wireless circuitry may include a processor for generating baseband signals, an upconversion circuit for upconverting (mixing) the baseband signals into radio-frequency signals, an amplifier for amplifying the radio-frequency signals, and an antenna for radiating the amplified radio-frequency signals.

The amplifier may be a load modulated radio-frequency power amplifier having multiple adjustable load components each configured to cover a different modulation range. The load modulated radio-frequency amplifier is sometimes referred to as a load-line modulated (LLM) power amplifier. A first of the adjustable load components can be used to provide impedance tuning that covers a first subrange of an instantaneous signal envelope of the baseband signals, whereas a second of the adjustable load components can be used to provide impedance tuning covering a second subrange of the instantaneous signal envelope of the baseband signals. The use of multiple adjustable load components can collectively provide a wider effective load (impedance) tuning range for the load modulated radio-frequency amplifier.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed from plastic, glass, ceramics, fiber composites, metal (e.g., stainless steel, aluminum, metal alloys, etc.), other suitable materials, or a combination of these materials. In some embodiments, parts or all of housing 12 may be formed from dielectric or other low-conductivity material (e.g., glass, ceramic, plastic, sapphire, etc.). In other embodiments, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using the antenna(s).

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
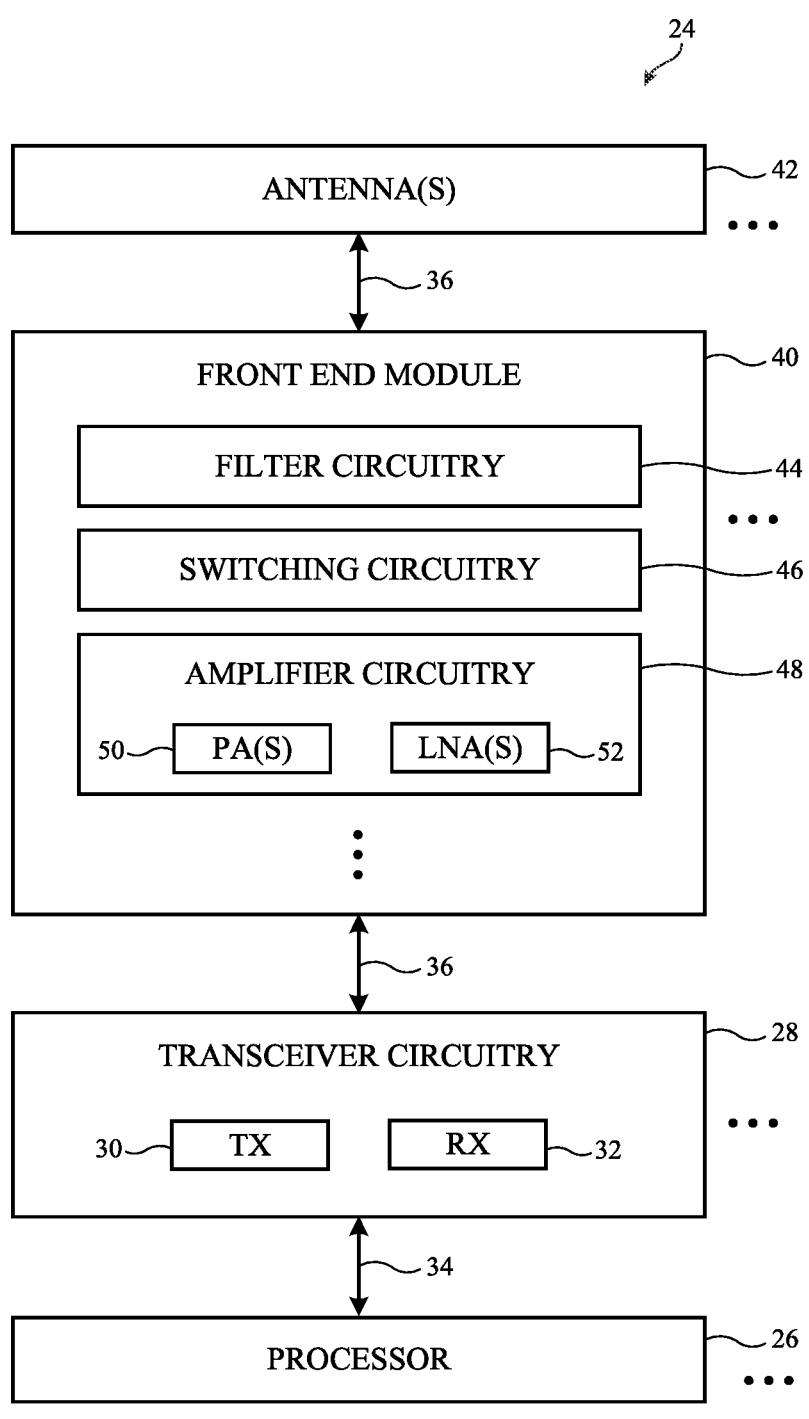
FIG. 2 is a diagram of illustrative wireless circuitry having amplifiers in accordance with some embodiments.

FIG. 2 is a diagram showing illustrative components within wireless circuitry 24. As shown in FIG. 2, wireless circuitry 24 may include a processor such as processor 26, radio-frequency (RF) transceiver circuitry such as radio-frequency transceiver 28, radio-frequency front end circuitry such as radio-frequency front end module (FEM) 40, and antenna(s) 42. Processor 26 may be a baseband processor, application processor, general purpose processor, microprocessor, microcontroller, digital signal processor, host processor, application specific signal processing hardware, power management unit, or other type of processor. Processor 26 may be coupled to transceiver 28 over path 34. Transceiver 28 may be coupled to antenna 42 via radio-frequency transmission line path 36. Radio-frequency front end module 40 may be disposed on radio-frequency transmission line path 36 between transceiver 28 and antenna 42.

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 28, any desired number of front end modules 40, and any desired number of antennas 42. Each processor 26 may be coupled to one or more transceiver 28 over respective paths 34. Each transceiver 28 may include a transmitter circuit 30 configured to output uplink signals to antenna 42, may include a receiver circuit 32 configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths 36 in wireless circuitry 24 may be implemented without any front end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards.

In performing wireless transmission, processor 26 may provide transmit signals (e.g., digital or baseband signals) to transceiver 28 over path 34. Transceiver 28 may further include circuitry for converting the transmit (baseband) signals received from processor 26 into corresponding radio-frequency signals. For example, transceiver circuitry 28 may include mixer circuitry for up-converting (or modulating) the transmit (baseband) signals to radio frequencies prior to transmission over antenna 42. The example of FIG. 2 in which processor 26 communicates with transceiver 28 is illustrative. In general, transceiver 28 may communicate with a baseband processor, an application processor, general purpose processor, a microcontroller, a microprocessor, or one or more processors within circuitry 18. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front end module 40. Antenna 42 may transmit the radio-frequency signals to external wireless equipment by radiating the radio-frequency signals into free space.

Front end module (FEM) 40 may include radio-frequency front end circuitry that operates on the radio-frequency signals conveyed (transmitted and/or received) over radio-frequency transmission line path 36. FEM 40 may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other desired circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip. If desired, amplifier circuitry 48 and/or other components in front end 40 such as filter circuitry 44 may also be implemented as part of transceiver circuitry 28.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front end module 40. For example, transceiver 28 may be formed on another substrate such as the main logic board of device 10, a rigid printed circuit board, or flexible printed circuit that is not a part of front end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processor 26 and/or portions of transceiver 28 (e.g., a host processor on transceiver 28) may form a part of control circuitry 14. Control circuitry 14 (e.g., portions of control circuitry 14 formed on processor 26, portions of control circuitry 14 formed on transceiver 28, and/or portions of control circuitry 14 that are separate from wireless circuitry 24) may provide control signals (e.g., over one or more control paths in device 10) that control the operation of front end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1

(FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

As described above, front end module 40 may include one or more power amplifiers (PA) circuits 50 in the transmit (uplink) path. A power amplifier 50 (sometimes referred to as radio-frequency power amplifier, transmit amplifier, or amplifier) may be configured to amplify a radio-frequency signal without changing the signal shape, format, or modulation. Amplifier 50 may, for example, be used to provide 10 dB of gain, 20 dB of gain, 10-20 dB of gain, less than 20 dB of gain, more than 20 dB of gain, or other suitable amounts of gain.

It can be challenging to design a satisfactory radio-frequency power amplifier for an electronic device. In certain applications, the radio-frequency power amplifier can be implemented as a load-line modulated (LLM) radio-frequency power amplifier. A load-line modulated radio-frequency power amplifier (sometimes referred to herein as a load modulated radio-frequency amplifier) can have an adjustable load component, including an adjustable load line, that is tuned to provide different gain profiles. The adjustable load component, however, has a limited modulation (tuning) range. In other words, tuning of the adjustable load component may provide load line adaptation for only a subrange of an instantaneous signal envelope of the baseband signals generated at the output of processor 26.

In accordance with an embodiment, wireless circuitry 24 can be provided with load-line modulated amplifier circuitry that includes a plurality of adjustable load components each providing coverage for a different subrange of the instantaneous signal envelope. The plurality of adjustable load components can be tuned using different control signals. The control signals can be chosen such that the various tuning ranges of the adjustable load components can be stitched together to provide a broader (wider) tuning range.

Figure 3:
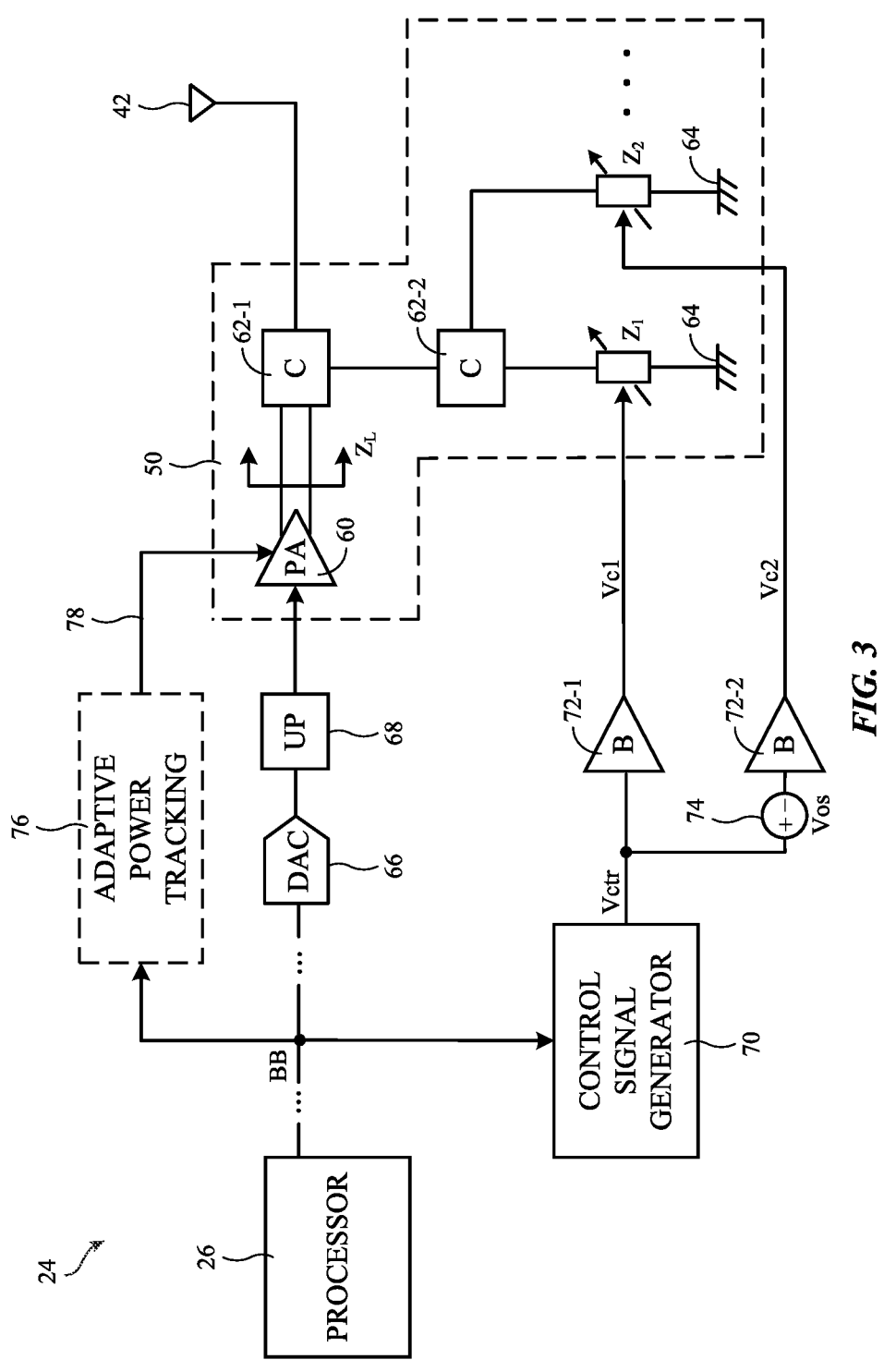
FIG. 3 is a diagram of illustrative wireless circuitry having a load modulated amplifier with multiple adjustable load components in accordance with some embodiments.

FIG. 3 is a diagram of illustrative wireless circuitry 24 having a load-line modulated amplifier circuit 50 having multiple adjustable load components each providing a different tuning (modulation) range. As shown in FIG. 3, wireless circuitry 24 may include processor 26 configured to generate baseband signals, a data converter such as digital-to-analog converter (DAC) 66, an upconversion circuit such as upconverter 68, a load-line modulated radio-frequency power amplifier circuit such as amplifier circuit 50, and an antenna 42 configured to radiate radio-frequency signals output from amplifier circuit 50.

Processor 26 may represent one or more processors such as a baseband processor, an application processor, a digital signal processor, a microcontroller, a microprocessor, a central processing unit (CPU), a programmable device, a combination of these circuits, and/or one or more processors within circuitry 18. Processor 26 may be configured to generate digital (baseband) signals BB. Signals BB generated at the output of processor 26 are sometimes referred to as baseband signals, digital signals, or transmit signals. As examples, the digital signals generated by processor 26 may include in-phase (I) and quadrature-phase (Q) signals, radius and phase signals, or other digitally-coded signals.

The digital baseband signals output from processor 26 may be converted from the digital domain into the analog domain using digital-to-analog converter 66 and then upconverted (modulated) to radio frequencies, using upconverter 68, from the baseband frequency range (which is typically in the range of a couple hundred kHz to a couple hundred MHz) to radio frequencies in the range of hundreds of MHz or in the GHz range. Upconverter 68 is sometimes referred to as a radio-frequency modulator or a radio-frequency mixer.

The upconverted radio-frequency signals may be fed as an input to radio-frequency (RF) amplifier circuit 50. Amplifier circuit 50 may include an amplifier 60 having an input configured to receive the upconverted radio-frequency signals from modulator 68 and having an output coupled to a plurality of adjustable load components including but not limited to a first adjustable load component Z1 and a second adjustable load component Z1. Adjustable load component Z1 may have a first terminal coupled to the output of amplifier 60 via at least a first coupling circuit 62-1 and a second terminal coupled to a ground power supply line 64 (e.g., a ground line on which a ground power supply voltage is provided). Adjustable load component Z2 may have a first terminal coupled to the output of amplifier 60 via at least a second coupling circuit 62-2 and a second terminal coupled to ground 64.

Adjustable load components Z1 and Z2 can each be a tunable resistance (e.g., an adjustable resistor), a tunable capacitance (e.g., an adjustable capacitor), a tunable inductance (e.g., an adjustable inductor), other reactive or lossless electrical component, a combination of these components, or other adjustable impedance component(s). The example of FIG. 3 in which load-line modulated amplifier circuit 50 includes at least two adjustable impedance components Z1 and Z2 is illustrative. In general, amplifier circuit 50 may include three or more adjustable impedance components, four or more adjustable impedance components, 5-10 adjustable impedance components, or more than 10 adjustable impedance components each providing a different tuning/modulation range.

Adjusting load components Z1 and Z2 can tune the load impedance seen by amplifier 60 from its output (see, e.g., load impedance $Z_L$ seen by the amplifier core), which can shift the gain curve response of amplifier circuit 50. Adjustable load component Z1 can be controlled using a first control voltage signal Vc1 (sometimes referred to as a first load tuning control signal), whereas adjustable load component Z2 can be controlled using a second control voltage signal Vc2 (sometimes referred to as a second load tuning control signal). First control signal Vc1 can be output from a first buffer or voltage driver 72-1 based on a first envelope signal. Second control signal Vc2 can be output from a second buffer or voltage driver 72-2 based on a second envelope signal that is shifted from the first envelope signal by an offset. In the example of FIG. 3, control signals Vc1 and Vc2 are both generated based on an envelope signal Vctr output from control signal generator 70. Control signal (voltage) Vctr may be fed directly to the input of buffer 72-1. On the other hand, control voltage Vctr can be fed via a voltage offset component 74 to the input of buffer 72-2. Operated in this way, the control signal Vc2 output from buffer 72-2 may deviate from control signal Vc1 by a voltage offset Vos (e.g., second buffer 72-2 is configured to receive a shifted version of the control voltage Vctr). Voltage offset Vos can be a predetermined voltage, a fixed voltage, or an adjustable voltage. The offset between the two load tuning control signals being shown as a voltage is exemplary. In general, the offset can be implemented in a non-voltage domain such as in a digital domain prior to digital-to-analog conversion. In such scenarios, buffer 72-1 can be a first digital-to-analog (D/A) conversion circuit and buffer 72-2 can be a second digital-to-analog (D/A) conversion circuit.

Control signal generator 70 may receive baseband signal BB from processor 26 and output corresponding control voltage Vctr. Control voltage Vctr may be an envelope signal of the baseband signal BB or the radio-frequency signal input to amplifier circuit 50. Control signal generator 70 may include an absolute value function generator, a signal shaping function, a linear or non-linear transformation function, a combination of these functions, or other signal conditioning function for outputting control voltage Vctr. If desired, control signal generator 70 may also include a non-linearity estimator (e.g., an amplifier non-linearity estimator that models a non-linear behavior of amplifier 50), an amplifier load response estimator (e.g., an amplifier load response estimator that implements a baseband model of a frequency-dependent response of a load at the output of amplifier 50), and/or other circuitry that can otherwise help tune components Z1 and Z2 for optimum performance and efficiency. Control voltage Vctr may be a function of or is derived from an instantaneous signal envelope of baseband signal BB or an instantaneous signal envelope of the radio-frequency signal at the input of amplifier circuit 50. Control voltage Vctr can therefore sometime be referred to as an envelope signal. For example, the first control signal Vc1 can be generated based on a first subrange of envelope signal Vctr, whereas the second control signal Vc2 can be generated based on a second subrange of envelope signal Vctr, where Vc1 and Vc2 are shifted by a fixed or adjustable offset. By shifting control signal Vc2 relative to control signal Vc1 by an offset amount, adjustable load components Z1 and Z2 can separately react to different regions or subranges of the overall voltage range of the instantaneous signal envelope of the baseband or RF signal.

Wireless circuitry 24 can optionally include an adaptive power tracking (APT) circuit 76. Adaptive power tracking circuit 76 can receive baseband signal BB from processor 26 and output a control signal to amplifier 60 via control path 78. Unlike envelope tracking (ET) techniques that constantly varies the power supply voltage of amplifier 60, adaptive power tracking circuit 76 can be used to provide a relatively constant power supply voltage to amplifier 60. Adaptive power tracking circuit 76 can adjust amplifier 60 to operate in different power modes. When the overall power level of the radio-frequency signals arriving at the input of amplifier circuit 50 is low, adaptive power tracking circuit 76 can provide a relatively high power supply voltage to amplifier 60 so that amplifier 60 can operate in a high power mode. Conversely, when the overall power level of the radio-frequency signals arriving at the input of amplifier circuit 50 is low, adaptive power tracking circuit 76 can provide a relatively low power supply voltage to amplifier 60 so that amplifier 60 can operate in a low power mode. In general, adaptive power tracking circuit 76 can provide amplifier circuit 50 with fine power mode tuning capabilities, coarse power mode tuning capabilities, and/or can direct amplifier 60 to operate in any suitable number of power modes.

Figure 4:
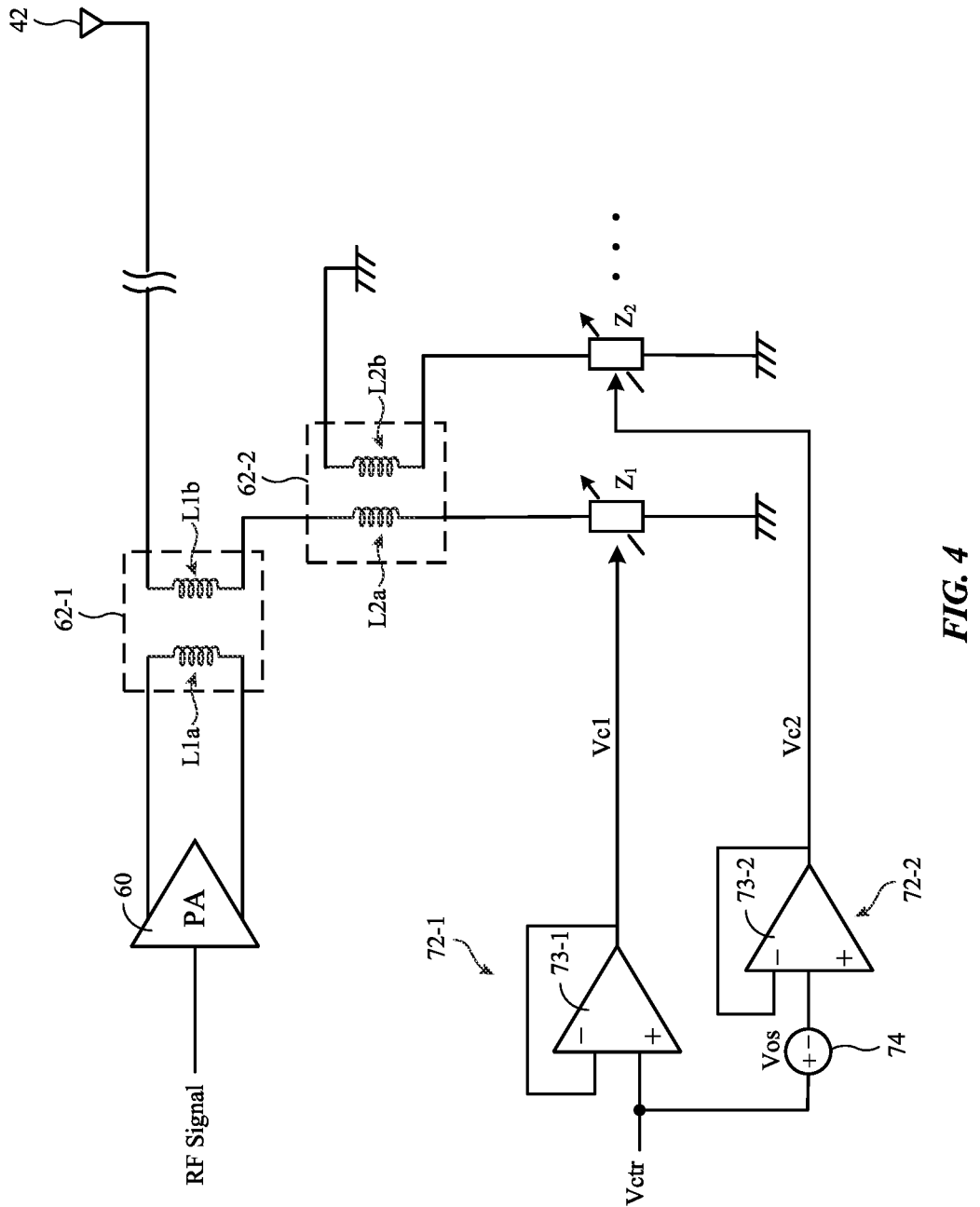
FIG. 4 is a circuit diagram of an illustrative load modulated amplifier connected to at least two adjustable load components via coupling circuits in accordance with some embodiments.

FIG. 4 is a circuit diagram showing one suitable implementation of a portion of wireless circuitry 24. In the example of FIG. 4, coupling circuits 62-1 and 62-2 can be implemented as transformers. First coupling circuit 62-1 can include a primary coil (winding) L1a coupled to the output of amplifier 60 and a secondary coil (winding) L1b coupled to antenna 42. In particular, secondary coil L1b may have a first terminal coupled to antenna 42 and the second terminal coupled in series with first adjustable load component Z1. Second coupling circuit 6202 can include a primary coil (winding) L2a and a secondary coil (winding) L2b. Primary coil L2a may have a first terminal coupled to first coupling circuit 62-1 and a second terminal coupled to first adjustable load component Z1. Secondary coil L2b may have a first terminal coupled to a power supply line (e.g., a ground line as shown in FIG. 4 or alternatively a positive power supply line) and a second terminal coupled to second adjustable load component Z2. The use of transformers as coupling circuits 62-1 and 62-2 is exemplary. If desired, other types of radio-frequency coupling structures can be employed.

In FIG. 4, first voltage driver circuit 72-1 may be implemented as a first unity gain buffer 73-1 (e.g., an operational amplifier connected in the unity gain configuration), whereas second voltage driver circuit 72-2 may be implemented as a second unity gain buffer 73-2. Configured in this way, voltage drivers 72-1 and 72-2 can pass through their respective control voltages with a gain of one. The use of unity gain buffers is exemplary. If desired, other types of buffer or driver circuits that provide a voltage gain of one, greater than one, or less than one can be employed for driving control signals Vc1 and Vc2.

The embodiment of FIG. 4 in which adjustable load components Z1 and Z2 are coupled to the output of amplifier 60 via first and second coupling circuits 62-1 and 62-2 is exemplary. In other embodiments, the various adjustable load components can be coupled to the output of amplifier 60 via a single (joint) coupling circuit. For example, adjustable load components Z1 and Z2 can be coupled to the output of amplifier 60 via a multi-winding inductor or transformer having a primary coil (winding) connected to the output port of amplifier 60, a $1^{st}$ secondary coil (winding) connected to adjustable load component Z1, and a $2^{nd}$ secondary coil (winding) connected to adjustable load component Z2. In general, such multi-winding inductor or transformer can include any number of secondary coils (winding) for coupling to any desired number of adjustable load components.

Figure 5:
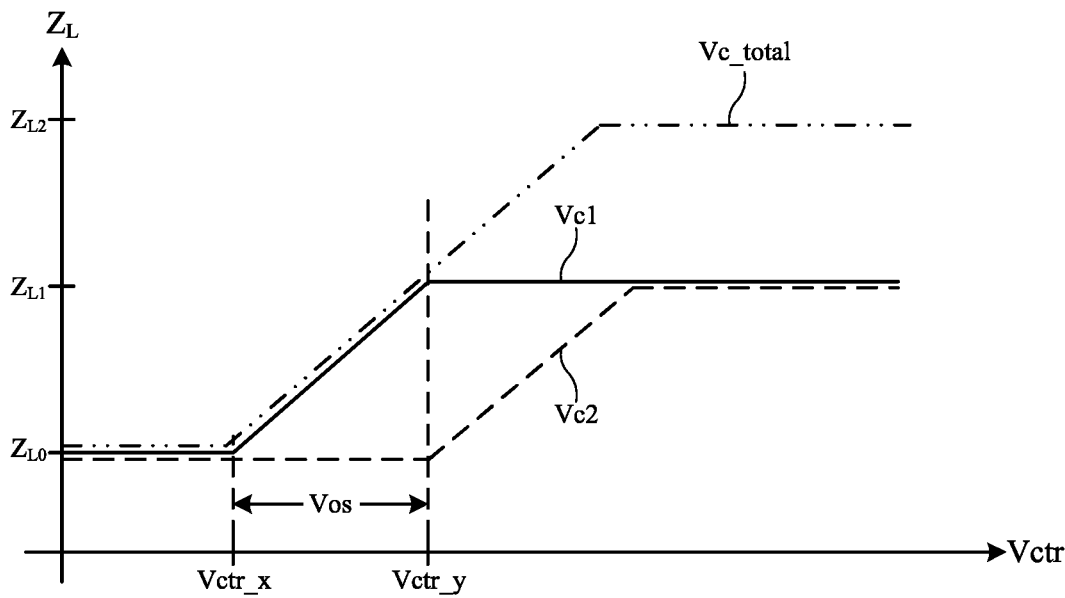
FIG. 5 is a diagram plotting an amplifier load impedance as a function of control voltage signals for tuning the adjustable load components of FIG. 4 in accordance with some embodiments.

FIG. 5 is a diagram plotting amplifier load impedance $Z_L$ as a function of the control voltage signals for tuning adjustable load components Z1 and Z2 of FIG. 4. As shown in FIG. 5, control signal Vc1 may start increasing first when Vctr exceeds a first voltage level Vctr_x. Adjusting load tuning control signal Vc1 may tune first load component Z1 to vary the amplifier load impedance between impedance values $Z_{L0}$ and $Z_{L1}$. Due to the voltage offset, control signal Vc2 may only start increasing when Vctr exceeds a second voltage level Vctr_y that is greater than Vctr_x. Voltage Vctr_y may be greater than voltage Vctr_x by offset amount Vos. By offsetting Vc2 relative to Vc1, adjustable load components Z1 and Z2 can have shifted tuning ranges. Adjusting load tuning control signal Vc2 may tune second load component Z2 to effectively vary the amplifier load impedance between impedance values $Z_{L1}$ and $Z_{L2}$ (see, e.g., the total voltage tuning curve Vc_total).

Thus, the use to two separate adjustable load components controlled by different voltage signals can provide a wider effective overall tuning range than either of the adjustable load components by themselves. In other words, tuning the first load component Z1 using control signal Vc1 can provide a first tuning range for a first portion of the instantaneous signal envelope of the baseband or RF signal (e.g., for a first subrange covering small signal envelopes), whereas tuning the second load component Z2 using control signal Vc2 can provide a second tuning range for a second portion of the instantaneous signal envelope of the baseband or RF signal (e.g., for a second subrange covering large signal envelopes). The first and second tuning ranges can collectively provide an extended or broader effective modulation range covering all possible or most of the signal envelope values.

Figure 6:
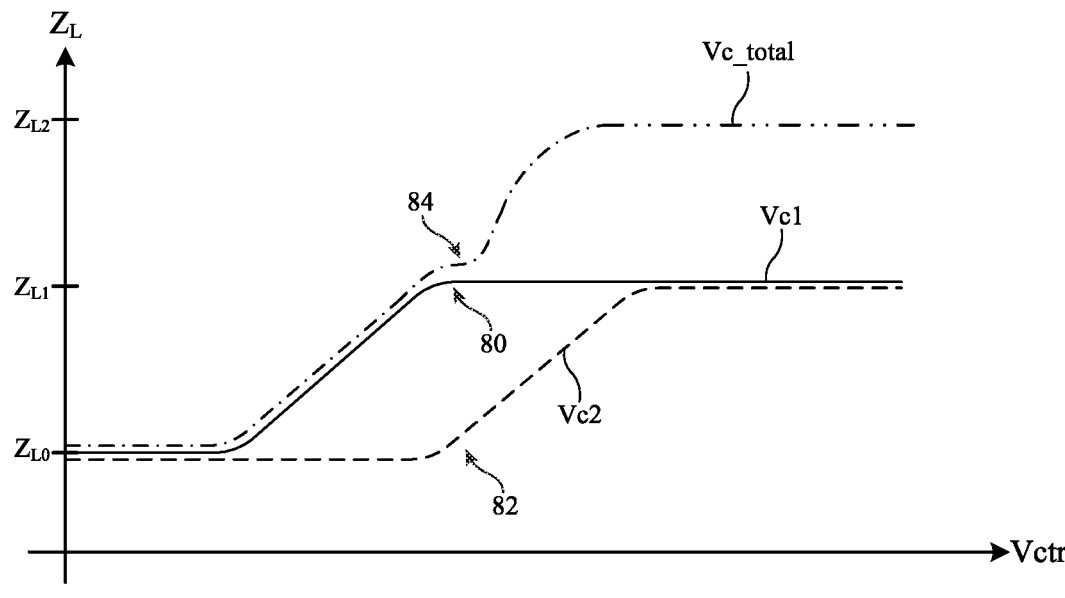
FIG. 6 is a diagram showing how adjustable load components can have partially overlapping tuning ranges in accordance with some embodiments.

The example of FIG. 5 illustrates a scenario in which the tuning ranges associated with Vc1 and Vc2 are non-overlapping. As shown in FIG. 5, the amplifier load impedance is increased from $Z_{L0}$ to $Z_{L1}$ by solely increasing Vc1, and Vc2 picks up right after Vc1 to increase the amplifier load impedance from $Z_{L1}$ to $Z_{L2}$ with no discontinuity or kinks in the overall effective impedance curve corresponding to Vc_total. In practice, however, the tuning ranges associated with Vc1 and Vc2 can be at least partially overlapping (see, e.g., FIG. 6). This may be a result of curved transitions such as curving portion 80 in the Vc1 profile and curving portion 82 in the Vc2 profile. This can show up as slight deviations 84 in the overall effective impedance curve corresponding to Vc_total. Regardless, overlapping tuning ranges can provide a wider effective total modulation range for the load-line modulated amplifier.

Figure 7:
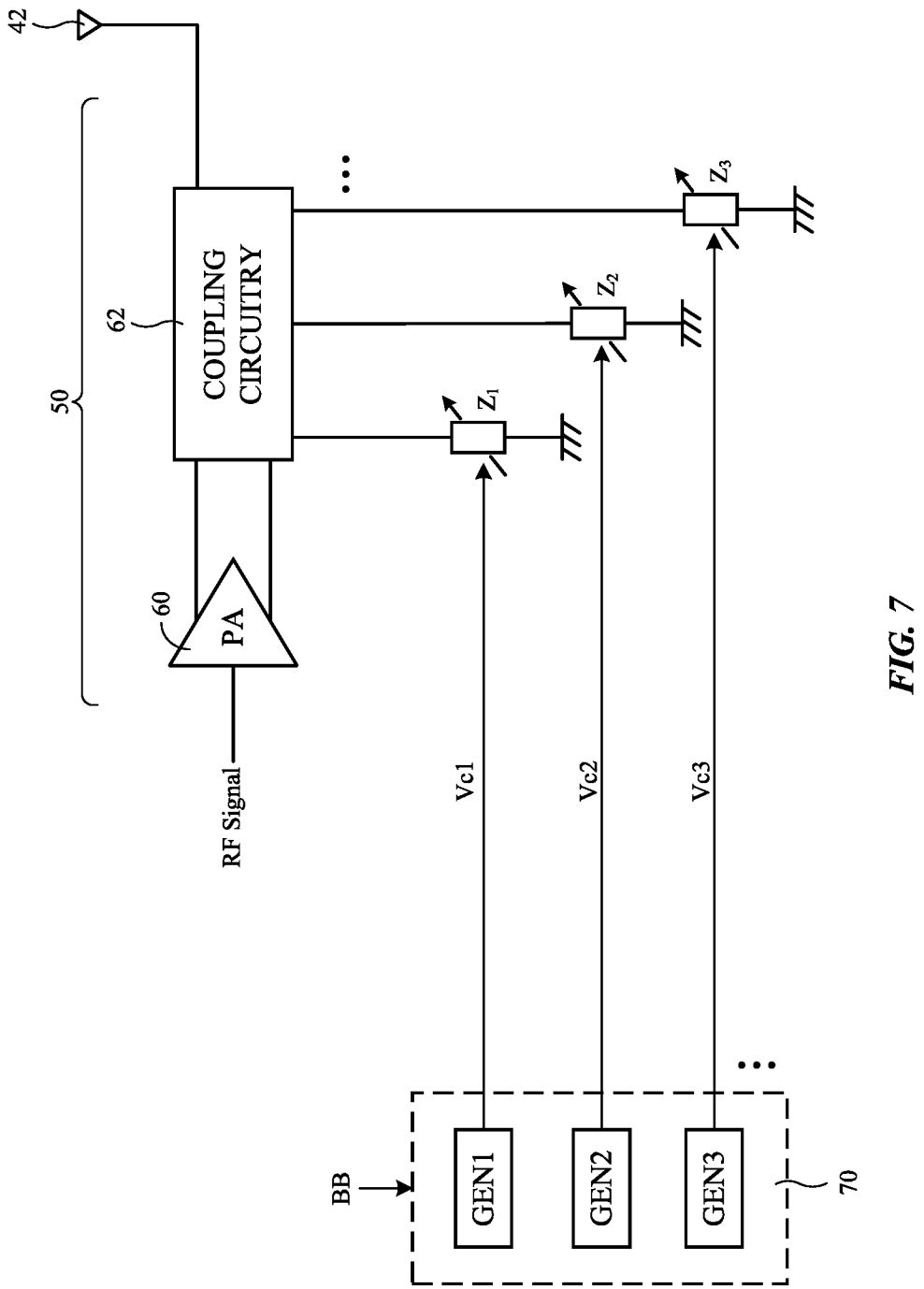
FIG. 7 is a diagram of an illustrative load modulated amplifier coupled to at least three adjustable load components with three separate tuning ranges in accordance with some embodiments.

The embodiment of FIG. 3 in which amplifier circuit 50 is provided with at least two separate adjustable load components Z1 and Z2 is exemplary. FIG. 7 shows another embodiment in which amplifier circuit 50 is provided with more than two adjustable load components. As shown in FIG. 7, amplifier 60 may be coupled to at least three adjustable load components Z1, Z2, and Z3 with coupling circuitry 62. Coupling circuitry 62 may be transformer based couplers, coupling structures based on closely coupled transmission lines, or other types of radio-frequency signal coupling circuits.

Adjustable load component Z1 may receive a first control signal Vc1 from control signal generator 70. Adjustable load component Z2 may receive a second control signal Vc2 from control signal generator 70. Adjustable load component Z3 may receive a third control signal Vc3 from control signal generator 70. Control signals Vc1, Vc2, and Vc3 may each be a function of or can be derived from an instantaneous signal envelope of baseband signal BB received from processor 26 or an instantaneous signal envelope of the RF signal at the input of amplifier circuit 50. Signals Vc1, Vc2, and Vc3 may be optionally shifted with respect to one another by fixed or adjustable voltage offset amounts. In the example of FIG. 7, control signal generator 70 includes three separate generator sub-circuits for outputting Vc1, Vc2, and Vc3 respectively. In other embodiments, a single generator can output Vctr, one of which is fed through as Vc1 while additional voltage offsets can be introduced to successively generate Vc2 and Vc3 in a way similar to the embodiments of FIGS. 3 and 4.

Configured in this way, adjustable load component Z1 can be tuned using Vc1 to provide a first tuning range covering a first subrange of the instantaneous signal envelope of the baseband or RF signal; adjustable load component Z2 can be tuned using Vc2 to provide a second tuning range, non-overlapping or partially overlapping with the first tuning range, covering a second subrange of the instantaneous signal envelope; and adjustable load component Z3 can be tuned using Vc3 to provide a third tuning range, non-overlapping or partially overlapping with the second tuning range, covering a third subrange of the instantaneous signal envelope. Operated in this way, the load-line modulated amplifier circuit 50 can exhibit a broader (extended) total tuning range that is a sum of the first, second, and third tuning ranges.

The example of FIG. 7 in which load-line modulated amplifier circuit 50 includes at least three adjustable load components Z1, Z2, and Z3 is illustrative. In general, amplifier circuit 50 may include more than three adjustable load components, four or more adjustable load components, 5-10 adjustable load components, 10-20 adjustable load components, or more than 20 adjustable load components each providing a different tuning/modulation range corresponding to different subranges of the overall voltage range of the instantaneous signal envelope of the baseband or RF signal.

Figure 8:
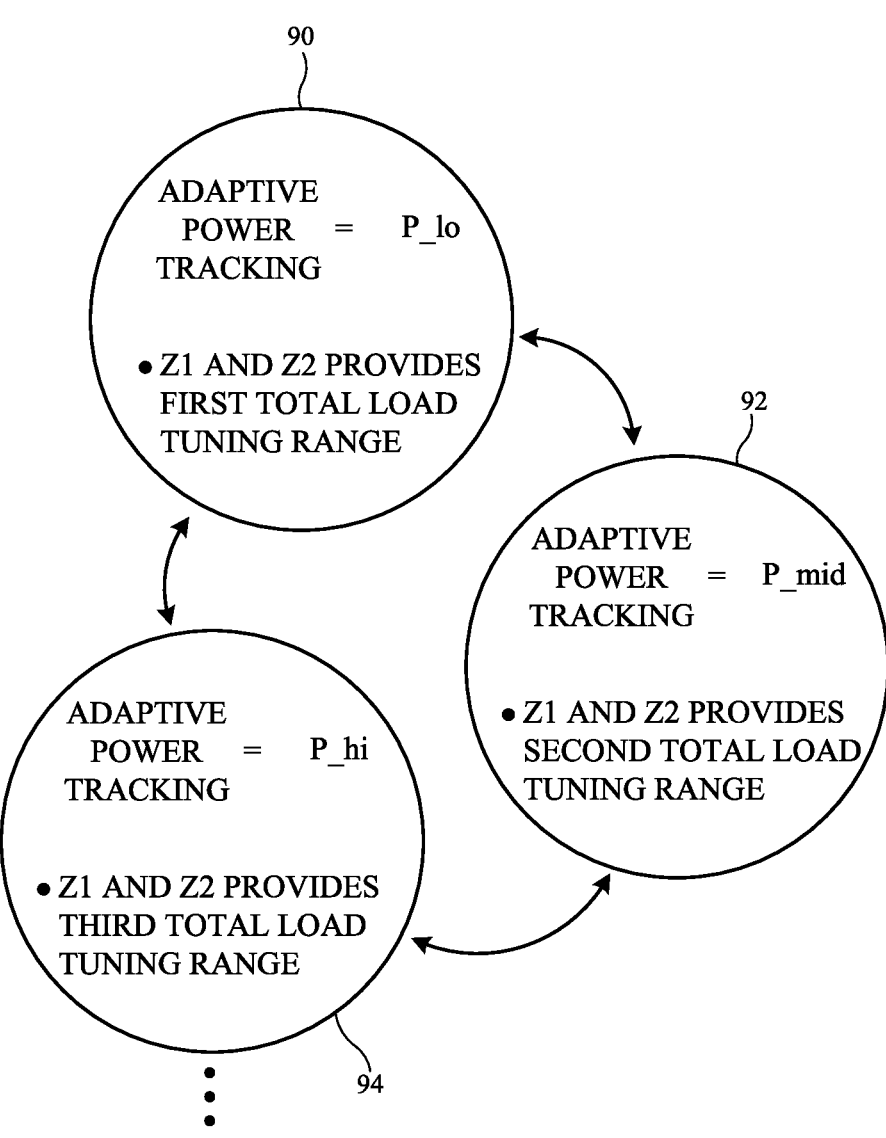
FIG. 8 is a state diagram showing how a load modulated amplifier can be operable in a plurality of adaptive power tracking (APT) modes in accordance with some embodiments.

As described above in connection with FIG. 3, wireless circuitry 24 can optionally include an adaptive power tracking circuit 76 that can be used to operate the load-line modulated amplifier in a plurality of different power modes. FIG. 8 is a state diagram showing how load-line modulated amplifier circuit 50 of the type described in connection with FIGS. 2-7 can be operable in at least a first power mode 90, a second power mode 92, and a third power mode 94.

In the first power mode 90, adaptive power tracking circuit 76 may provide a relatively low power supply voltage to amplifier 60 such that amplifier 60 operates in a low power mode. In this mode 90, adjustable load components Z1 and Z2 (and optionally additional load components) can be separately tuned using Vc1 an Vc2 to provide a first total load tuning range when the amplifier is operating in the low power mode.

In the second power mode 92, adaptive power tracking circuit 76 may provide an intermediate (medium) power supply voltage to amplifier 60 such that amplifier 60 operates in a medium (normal) power mode. In this mode 92, adjustable load components Z1 and Z2 (and optionally additional load components) can be separately tuned using Vc1 an Vc2 to provide a second total load tuning range when the amplifier is operating in the medium power mode. The second total load tuning range may be non-overlapping or only partially overlapping with the first total load tuning range.

In the third power mode 94, adaptive power tracking circuit 76 may provide an high (boosted) power supply voltage to amplifier 60 such that amplifier 60 operates in a high power mode. In this mode 94, adjustable load components Z1 and Z2 (and optionally additional load components) can be separately tuned using Vc1 an Vc2 to provide a third total load tuning range when the amplifier is operating in the high power mode. The third total load tuning range may be non-overlapping or only partially overlapping with the first and second total load tuning ranges. By combining the flexible power modes provided by adaptive power tracking circuit 76 and the extended tuning ranges provided by the multiple adjustable load components, the LLM amplifier circuitry can exhibit a much broader tuning capability across a wide range of power modes.

The example of FIG. 8 showing only three different power modes is illustrative. In general, adaptive power tracking circuit 76 can direct the LLM amplifier to operate in more than three different power modes, in 3-10 different power modes, in 10-20 different power modes, in 20-100 different power modes, or in more than 100 different power modes. In each of the various power modes, the overall effective tuning range can be expanded using two or more adjustable load components each covering a different subrange of an instantaneous signal envelope of a baseband or RF signal.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Wireless circuitry comprising:
   a radio-frequency amplifier configured to receive a radio-frequency signal generated from a baseband signal;
   a first adjustable load component coupled to an output of the radio-frequency amplifier;
   a second adjustable load component coupled to the output of the radio-frequency amplifier;
   a control signal generator configured to output one or more control signals for tuning the first and second adjustable load components based on an envelope of the baseband signal or the radio-frequency signal; and
   a transformer having
      a primary coil coupled between the output of the radio-frequency amplifier and the first adjustable load component and
      secondary coil coupled between the second adjustable load component and a power supply line.

2. The wireless circuitry of claim 1, wherein the first adjustable load component is configured to provide a first impedance tuning range for a first subrange of the envelope and wherein the second adjustable load component is configured to provide a second impedance tuning range for a second subrange of the envelope that is different than the first subrange.

3. The wireless circuitry of claim 1, further comprising:
an additional transformer coupled between the output of the radio-frequency amplifier and the transformer.

4. The wireless circuitry of claim 3, wherein the additional transformer has a primary coil coupled to the output of the radio-frequency amplifier and a secondary coil coupled between an antenna and the primary coil of the transformer.

5. The wireless circuitry of claim 1, wherein the control signal generator is configured to output a first control signal for tuning the first adjustable load component based on a first envelope signal and to output a second control signal for tuning the second adjustable load component based on a second envelope signal, and wherein the second envelope signal is shifted from the first envelope signal by an offset.

6. The wireless circuitry of claim 1, further comprising:
a third adjustable load component coupled to the output of the radio-frequency amplifier and configured to receive the one or more control signals from the control signal generator.

7. The wireless circuitry of claim 1, wherein the control signal generator comprises an absolute value function circuit.

8. The wireless circuitry of claim 1, wherein the first and second adjustable load components comprise adjustable impedances.

9. A method of operating wireless circuitry, comprising:
receiving at an amplifier a radio-frequency signal that is generated based on a baseband signal;
with a control signal generator, generating a control signal based on an envelope of the baseband signal;
with a first conversion circuit, receiving the control signal and outputting a first load tuning control signal based on a first range of the control signal;
with a second conversion circuit, outputting a second load tuning control signal based on a second range of the control signal;
tuning a first adjustable load component coupled to an output of amplifier using the first load tuning control signal;
tuning a second adjustable load component coupled to the output of the amplifier using the second load tuning control signal; and
shifting the second load tuning control signal from the first load tuning control signal by a fixed or adjustable offset.

10. The method of claim 9, further comprising:
using the first adjustable load component to provide a first impedance tuning range for a first subrange of the envelope; and using the second adjustable load component to provide a second impedance tuning range, different than the first impedance tuning range, for a second subrange of the envelope.

11. The method of claim 9, further comprising:
coupling a third adjustable load component to the output of the amplifier; and
tuning the third adjustable load component using a third load tuning control signal that is derived from the envelope of the baseband signal.

12. An electronic device comprising:
one or more processors configured to generate a baseband signal;
an upconverter configured to convert the baseband signal into a radio-frequency signal; and
a load-line modulated amplifier circuit configured to amplify the radio-frequency signal, the load-line modulated amplifier circuit including
an amplifier configured to receive the radio-frequency signal,
a first adjustable load component coupled to an output of the amplifier and is configured to provide a first tuning range covering a first subrange of an instantaneous signal envelope of the baseband signal or the radio-frequency signal, and
a second adjustable load component coupled to the output of the amplifier and is configured to provide a second tuning range covering a second subrange of the instantaneous signal envelope of the baseband signal or the radio-frequency signal, wherein the first and second tuning ranges are combined to provide an extended tuning range for the load-line modulated amplifier circuit.

13. The electronic device of claim 12, wherein the load-line modulated amplifier circuit further comprises coupling circuitry that is coupled between the output of the amplifier and an antenna and that is configured to couple the first and second adjustable load components to the output of the amplifier.

14. The electronic device of claim 12, further comprising:
a control signal generator configured to receive the baseband signal and to generate a corresponding control signal that is used to tune the first and second adjustable load components;
a first buffer configured to receive the control signal and to generate a first load tuning control signal for tuning the first adjustable load component; and
a second buffer configured to receive a shifted version of the control signal and to generate a second load tuning control signal for tuning the second adjustable load component.

* * * * *